US007940789B2

(12) United States Patent  
Jeanne et al.

(10) Patent No.: US 7,940,789 B2
(45) Date of Patent: May 10, 2011

(54) METHOD FOR EVALUATING RADIO LINKS IN A COMMUNICATION NETWORK

(75) Inventors: Ludovic Jeanne, Rennes (FR); Patrick Fontaine, Rennes (FR); Renaud Dore, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1767 days.

(21) Appl. No.: 10/353,212

(22) Filed: Jan. 28, 2003

(65) Prior Publication Data
US 2003/0147423 A1 Aug. 7, 2003

(30) Foreign Application Priority Data

Feb. 1, 2002 (EP) .................................. 02290237

(51) Int. Cl.
*H04L 12/413* (2006.01)
(52) U.S. Cl. .............. 370/445; 370/241; 370/241.1; 370/247; 370/251; 370/328; 370/338; 370/346; 370/229; 370/447; 370/461; 370/462; 370/230; 370/230.1; 370/231; 370/232; 370/233; 370/234; 370/252; 370/253; 455/68; 455/69; 455/127.2; 455/500; 455/513; 455/515
(58) Field of Classification Search .............. 370/241, 370/241.1, 247, 521, 252, 253, 328, 338, 370/346, 229–234, 445, 447, 461, 462, 251; 455/513, 515, 68, 69, 127.1, 127.2, 500
See application file for complete search history.

(56) References Cited

U.S. PATENT DOCUMENTS

| | | | | |
|---|---|---|---|---|
| 4,680,753 A | * | 7/1987 | Fulton et al. .................. 370/449 |
| 5,406,555 A | * | 4/1995 | Yoshida ......................... 370/252 |
| 5,421,030 A | * | 5/1995 | Baran ............................ 725/106 |
| 5,467,341 A | * | 11/1995 | Matsukane et al. ............ 370/253 |
| 5,867,483 A | * | 2/1999 | Ennis et al. .................... 370/252 |
| 5,886,643 A | * | 3/1999 | Diebboll et al. ............... 709/224 |
| 6,049,549 A | * | 4/2000 | Ganz et al. .................... 370/449 |
| 6,097,703 A | * | 8/2000 | Larsen et al. .................. 370/254 |
| 6,240,094 B1 | * | 5/2001 | Schneider ...................... 370/412 |
| 6,289,217 B1 | * | 9/2001 | Hamalainen et al. .......... 455/425 |

(Continued)

FOREIGN PATENT DOCUMENTS

JP         11055294 A   *   2/1999

(Continued)

OTHER PUBLICATIONS

Crow B.P. et al. "IEEE 802.11 Wireless Local Area Networks" IEEE Communications Magazine, vol. 35. No. 9 of Sep. 1, 1997, pp. 116-126.

(Continued)

*Primary Examiner* — Aung S Moe
*Assistant Examiner* — Christopher P Grey
(74) *Attorney, Agent, or Firm* — Robert D. Shedd; Joseph J. Opalach; Jerome G. Schaefer

(57) ABSTRACT

The invention concerns a method for the rate regulation of radio link probing in a communication network comprising at least a receiver terminal and at least one transmitter terminal, characterized by the steps, at the level of the receiver terminal, of:

determining the amount of data sent by each transmitter terminal to the receiver terminal through respective radio links, when a probing of a link is to be made, probing the link corresponding to the transmitter terminal having sent the greatest amount of data.

7 Claims, 4 Drawing Sheets

U.S. PATENT DOCUMENTS

| | | | |
|---|---|---|---|
| 6,493,706 B1 * | 12/2002 | Mead et al. | 707/3 |
| 6,615,050 B1 * | 9/2003 | Tiedemann et al. | 455/522 |
| 6,747,968 B1 * | 6/2004 | Seppala et al. | 370/338 |
| 6,842,460 B1 * | 1/2005 | Olkkonen et al. | 370/465 |
| 6,977,944 B2 * | 12/2005 | Brockmann et al. | 370/461 |
| 7,120,126 B2 * | 10/2006 | Odman et al. | 370/252 |
| 2002/0080816 A1 * | 6/2002 | Spinar et al. | 370/449 |
| 2002/0172186 A1 * | 11/2002 | Larsson | 370/349 |

FOREIGN PATENT DOCUMENTS

JP    2003124940 A  *  4/2003

OTHER PUBLICATIONS

European Search Report of Jun. 28, 2002.

* cited by examiner

METHOD FOR EVALUATING RADIO LINKS IN A COMMUNICATION NETWORK

This application claims the benefit under 35 U.S.C. §365 of European patent application No. 02290237.3 filed Feb. 1, 2002.

BACKGROUND OF THE INVENTION

The invention concerns a method for evaluating radio links in a communication network, such as (but not limited to) an IEEE 802.11 network.

In a wireless network, two devices communicating over a radio link may be required to dynamically configure their transmission parameters. Such parameters may include in particular the emitter's active antenna sector or element in case of multi-sectored antenna, the automatic gain control settings, the frequency offset, the physical mode, the data rate or other parameters. Antennas comprising a plurality of elements are frequently encountered nowadays. One of the most popular antennas is the space diversity antenna of order 2, comprising two simple elements spaced by lambda/2 to reduce the probability of having both elements in a fading region.

Selecting the proper parameters has a direct influence on the robustness and the overall performance of a radio link. Indeed, it is known that wireless networks in the 2 to 5 GHz area are sensitive—among other factors—to people moving within a room. This movement induces significant changes of the channel characteristics. As a result, the selection of the active receiver antenna element may need to be updated. An update period of 100 Hz can be considered as sufficient compared to the speed of movement of people.

The European patent application 01402592.8, filed on Oct. 10, 2001 in the name of Thomson Licensing S. A. and entitled 'Methods and devices for radio link adaptation' describes methods and devices adapted to carry out radio link evaluation in a centralized network, such as a wireless network based on ETSI BRAN HiperLAN 2. Another European patent application filed on the same day as the present application in the name of Thomson Licensing S. A. and entitled 'Method for radio link adaptation in a non-coordinated network' concerns non-coordinated networks such as networks based on IEEE 802.11.

In these applications, receiver mobile terminals trigger the transmission of predetermined test data from known transmitter mobile terminals, in order to carry out the evaluation of the radio link with different transmission parameter values (antenna element, physical mode . . . ).

A receiver terminal can receive data from several transmitter terminals, and may be required to continuously evaluate links from all transmitter terminals in order to avoid fading. The probing may generate a significant amount of traffic on the network, and may also use a significant part of the receiver terminal's processing resources.

BRIEF SUMMARY OF THE INVENTION

The invention concerns a method for the rate regulation of radio link probing in a communication network comprising at least a receiver terminal and at least one transmitter terminal, characterized by the steps, at the level of the receiver terminal, of:

determining the amount of data sent by each transmitter terminal to the receiver terminal through respective radio links, when a probing of a link is to be made, probing the link corresponding to the transmitter terminal having sent the greatest amount of data.

The receiver terminal may thus attribute more probes to more active links.

According to an embodiment of the invention, the step of determining the amount of data comprises the step of accumulating a value of a function taking into account the amount of data in accumulators associated with respective transmitter terminals and wherein an accumulator is reset after a probe for its corresponding transmitter terminal has been carried out.

According to an embodiment of the invention, the amount of data received from a transmitter terminal is weighted before being added to a corresponding accumulator.

According to an embodiment of the invention, the weight used for the data from a given transmitter terminal is a function of the type of data transmitted by said given transmitter terminal.

According to an embodiment of the invention, a predetermined number of probes is allocated to a receiver terminal for a predetermined time period.

According to an embodiment of the invention, probing is carried out substantially periodically.

According to an embodiment of the invention, an element of a ordered chained list is associated with each transmitter terminal, each element comprising a transmitter terminal identifier, the current accumulator value and pointers to the previous and next element, the list being ordered according to decreasing accumulator content.

According to an embodiment of the invention, elements corresponding to transmitter terminals not having transmitted for a given period of time are removed from the list.

According to an embodiment of the invention, the method further comprises the step of probing transmitting terminals potentially transmitting data at a low rate compared to transmitting terminals from which the receiver terminal receives data.

BRIEF DESCRIPTION OF THE DRAWINGS

Other characteristics and advantages of the invention will become apparent through the description of a detailed, non-restrictive embodiment of the invention, explained with the help of the attached drawings, among which.

DETAILED DESCRIPTION OF AN EMBODIMENT OF THE INVENTION

The present embodiment concerns an implementation of the invention in a network conforming to the IEEE 802.11 standard published by the Institute of Electrical and Electronics Engineers, although the invention can also be applied in other contexts, such as—but not limited to—ETSI BRAN HiperLAN 2.

Different methods for link evaluation are described in the two patent applications mentioned in the introduction. Some details will be given for only one method in the present application. The reader should refer to the other two applications for more information.

While in the present embodiment, the link parameter to be tested is the receiver terminal's active antenna element, the invention is of course not limited to this particular parameter.

Networks based on the IEEE 802.11 standard, lack a centralized controller in at least certain network configurations. In a mode called Distributed Coordination Function (DCF) mode, IEEE 802.11 implements a Carrier Sense Medium Access—Collision Avoidance (CSMA-CA) contention-based mechanism to regulate access to the radio medium. According to this mechanism, a mobile terminal wishing to transmit carries out the following steps:

It listens to the medium to determine whether it is busy (i.e. whether another mobile terminal is transmitting).

Transmission is authorized only after a minimum idleness period.

If the medium is busy, the mobile terminal waits for the end of the busy period, waits for the minimum idleness period and enters into a random back-off period, after which it tries to transmit.

IEEE 802.11 offers a medium access mechanism called 'virtual carrier sense' (as opposed to physical carrier sense), which is a development of the CSMA/CA mechanism. One implementation of the virtual carrier sense mechanism is referred to as the RTS/CTS mechanism, RTS standing for Ready To Send and CTS for Clear To Send. These are the designations of two short control packets used in this mechanism, as will now be described.

Figure 1:
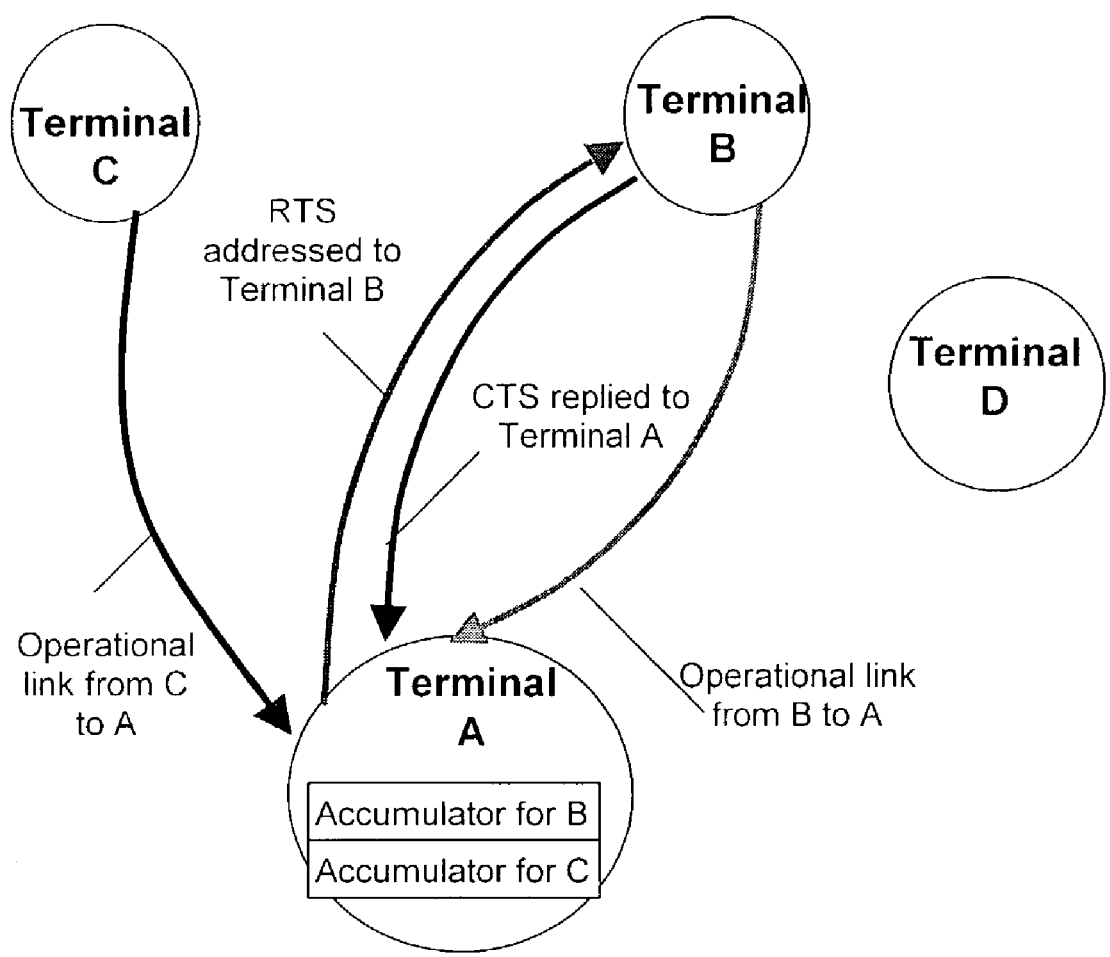
FIG. 1 is a diagram of a network according to the present embodiment, illustrating the message exchanges for evaluating a link between a receiver terminal and a transmitter terminal.

The RTS/CTS mechanism allows making a reservation of the medium for a specified amount of time for an impending transmission. FIG. 1 illustrates a network comprising mobile terminal A to D. An operational link exists between A and B. This link is used to send—for example—a video stream from B to A. Another link exists from terminal C to terminal A. No operational link exists with terminal D.

Link evaluation—also called probing in what follows—is carried out by having terminal A appropriately request terminal B to send data to terminal A, under certain reception conditions (antenna element, physical mode . . . ). The received information, including certain parameters linked to the reception of the signal (e.g. overall signal power, eventually combined with a criterion based on OFDM individual carrier power . . . ) can then be used to evaluate a quality criterion. This criterion is evaluated for a series of reception conditions, and the best value is retained. If the value found is better than the value valid for the operational link, then the parameters of the link are modified accordingly.

According to one embodiment of the already mentioned European patent application filed on the same day as the present application, this virtual carrier sense mechanism is used to trigger a predetermined response (under the form of an acknowledgment message sent by terminal B) at a time known in advance (after sending an empty data packet).

In a first step, terminal A sends the RTS frame.

In a second step, the currently valid antenna element identity and the quality criterion value are read and stored in a register.

In a third step, terminal A waits for the CTS frame sent by terminal B.

In a fourth step, terminal A selects an antenna element other than the one currently stored in the table for incoming transmissions from terminal B and sends a data packet without payload.

In a fifth step, terminal A waits for the acknowledgment ('ACK') frame sent by terminal B.

In a sixth step, terminal A evaluates the quality criterion based on ACK.

In a seventh step, terminal A compares the quality criterion to the one stored in the register. If the quality is higher, the new antenna element identity and the quality criterion value are memorized (step 8).

In a ninth step, it is decided whether the steps two to seven are to be repeated for other antenna elements.

In a tenth and last step, terminal A verifies whether the antenna element used for the operational link needs to be changed. If yes, the necessary steps are taken to modify the link parameters.

The probing process can be triggered by a variety of events, the following list being non-exhaustive:

(a) when the power-level of the received signal is below a threshold;

(b) when the incoming transmission from a given terminal is to be made more robust (for example in case of transmission of an isochronous stream, to avoid interruption of service);

(c) after having received a certain number of packets from a given terminal.

The rate of the probing may be a function of (the list being non-exhaustive):

(a) the channel dynamics, a frequency of 100 Hz being generally seen as sufficient in an environment with moving people;

(b) the sensitivity of the physical mode, some physical modes being known to be more sensitive to certain channel characteristics than others (e.g. a physical mode of Viterbi redundancy ¾ is more sensitive to the channel shape factor than a redundancy of ½;

(c) the load of the network, since it may be advisable to reduce bandwidth used for probing of this bandwidth is required for other purposes;

(d) the average bit rate on the link to be probed, a little used link deserving probably less attention (and thus less frequent probing) than a much used link.

Figure 2:
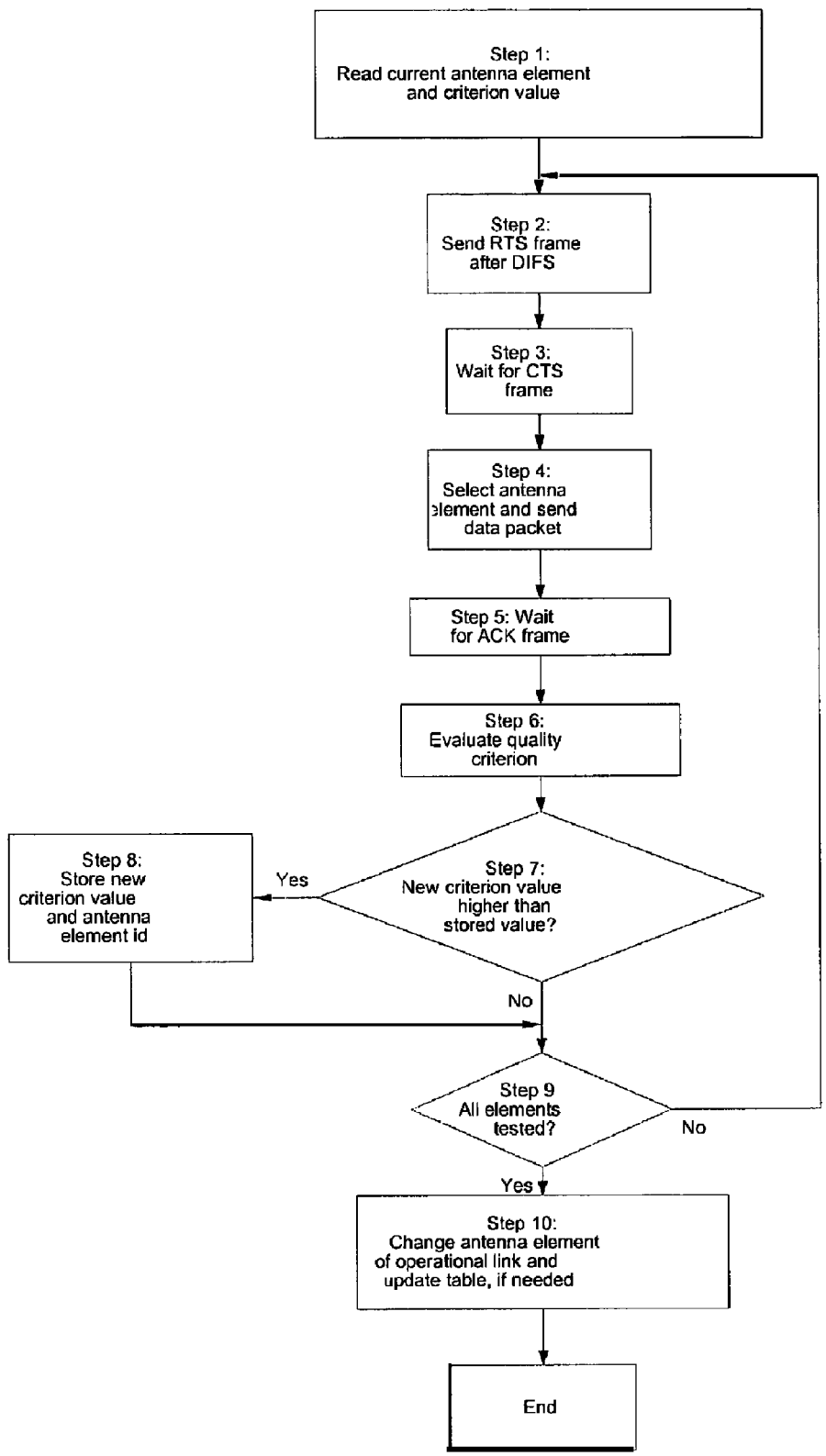
FIG. 2 is a flowchart of one method among others for probing a radio link.

When a data packet is received on the operational link, the receiver terminal determines the corresponding quality criterion value and stores this value in memory. When test packets such as the ACK frame are received according to the process of FIG. 2, the receiver terminal determines the criterion values and decides whether to modify the parameters of the operational link.

According to the present embodiment, each receiver terminal is allocated a predetermined number of probes per time period, e.g. at an average rate of 100 Hz according to the present embodiment, to be split for the evaluation of link with all its transmitter terminals (even terminals with which no operation link exists), in order to avoid overloading the network's or the terminals' capabilities. According to the present embodiment, the probing is not evenly split and depends on a certain number of factors. The inventors recognized that the speed at which channel characteristics change vary from channel to channel. Some channels will not change within a period of 1 second, while others (such as when subjected to moving people or objects) will change much faster. Accordingly, rules are defined have the receiver terminal to adapt the rate of its probes dynamically, transmitter terminal by transmitter terminal, to avoid that the parameters used for an operational link become obsolete compared to the actual channel characteristics. The average rate may be higher than 100 Hz, depending on the processing resources of the receiver and on the available network bandwidth.

According to the present embodiment, one factor taken into account for allocating more or less probes per time period to a given transmitter terminal is the quantity of data transiting through that channel.

In a preferred embodiment, the type or types of data transported over a channel are taken into account to generate weighting coefficients for the data received from each transmitter terminal.

Note that both factors may be considered independently.

The data types, also called 'service classes', considered here are the following: 'video', 'audio/voice', and 'data'. The service classes possess different constraints regarding transmission, and a service class weighting coefficient SCi is attributed to each class to define its priority over the other classes regarding the maintenance of a certain level of quality of service. The higher the coefficient, the higher the priority of the corresponding service class. In the frame of the present example the weighting coefficients are SCv, SCa and SCd for the video, audio and data service classes respectively. For example, SCa may be greater than SCv, since missing audio data is difficult to conceal, while SCv may itself may be greater than SCd, which may have less real-time constraints.

Terminals in the network are identified by their Medium Access Control Identifier (MAC Id). For each transmitting terminal with which it has an operational connection, a receiving terminal maintains an accumulator in an internal memory. In FIG. 1, the accumulators maintained by terminal A for terminals B and C are illustrated. When a new MAC Id appears in the network, for example from a terminal D to terminal A, then terminal A adds a further accumulator to its list, once it has received data from the new transmitting terminal.

For each MAC Id, a receiving terminal also determines a channel weighting coefficient Ci, using the service class weighting coefficients SCi. Data corresponding to several service classes may be transiting from a given transmitter terminal to a receiver terminal. For the purpose of the present example, the receiving terminal determines for each transmitting terminal (i.e. each MAC Id) the service class with the highest data rate, and uses the corresponding coefficient SCi for the entire channel. It is also possible to use a weighted average of the SCi coefficients, the weighting being a function of the relative weight of each service class. The coefficients Ci can be determined each time a new connection is added between a given transmitter terminal and a receiver terminal. The detailed process for determining the coefficients Ci as a function of the coefficients SCi is out of the scope of the present embodiment, and for all practical purposes, coefficients equal to unity may be used.

The process for selecting the next link to be probed is taken as follows:

In a first step, all accumulators are reset to zero (e.g. when a new packet from a new MAC id is received).

Then, each time the receiver terminal receives a data packet from one of the transmitter terminals, it weights the quantity of received data with the corresponding coefficient Ci (Size_of_packet received on link*Channel Weighting Coefficient Ci), and adds the result to the corresponding accumulator. It is assumed that in general, the higher the bit rate, the more important it is to avoid transmission errors, to avoid large buffers both at the transmitter and at the receiver. As mentioned above, while the coefficients Ci are equal according to the preferred embodiment, using different Ci coefficients enables to adapt this rule to the nature and/or priority of the data transmitted. Thus it is possible to avoid data transmission errors for low bit-rate transmissions simply by attributing a higher coefficient Ci to the corresponding MAC Id.

According to the present example, a receiver terminal carries out a probe every 100 Hz. When a probe is due, the receiver terminal examines the contents of the accumulators, determines which MAC Id corresponds to the accumulator with the highest content, carries out the probe for the MAC Id and resets the accumulator.

Figure 3:
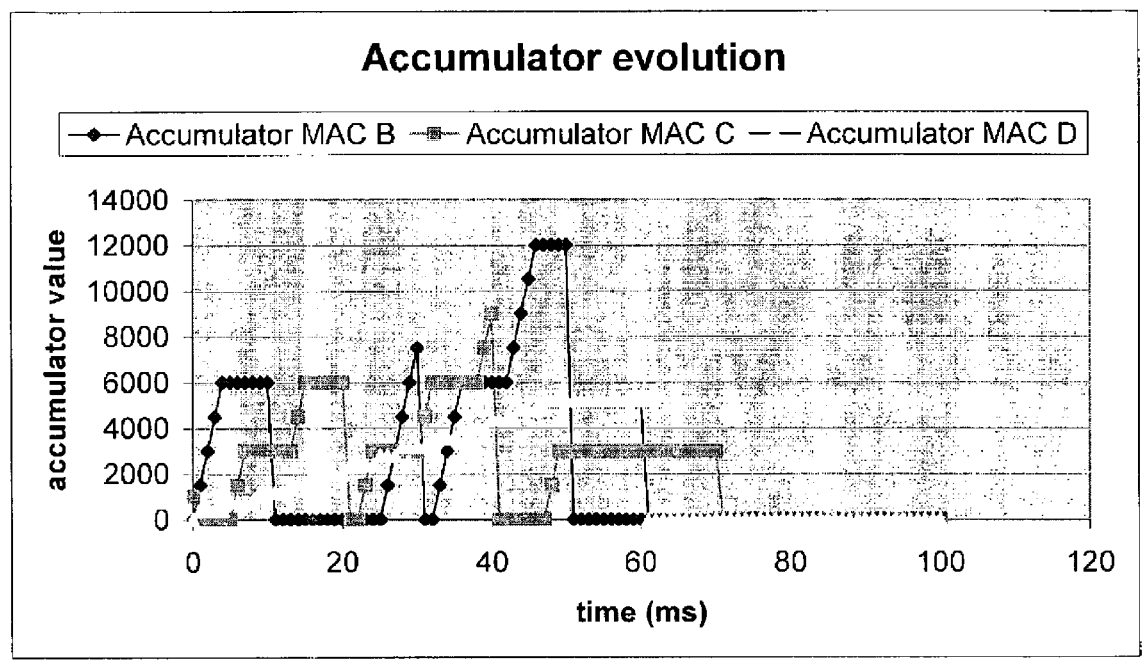
FIG. 3 is a temporal diagram of the evaluation or probing carried out by a receiver terminal of FIG. 1 of the links with three other terminals.

The graph of FIG. 3 is an example of the evolution of the content of the accumulators maintained by terminal A and corresponding to the three nodes B, C, and D. It is supposed here that D has also an operational link with A.

Figure 4:
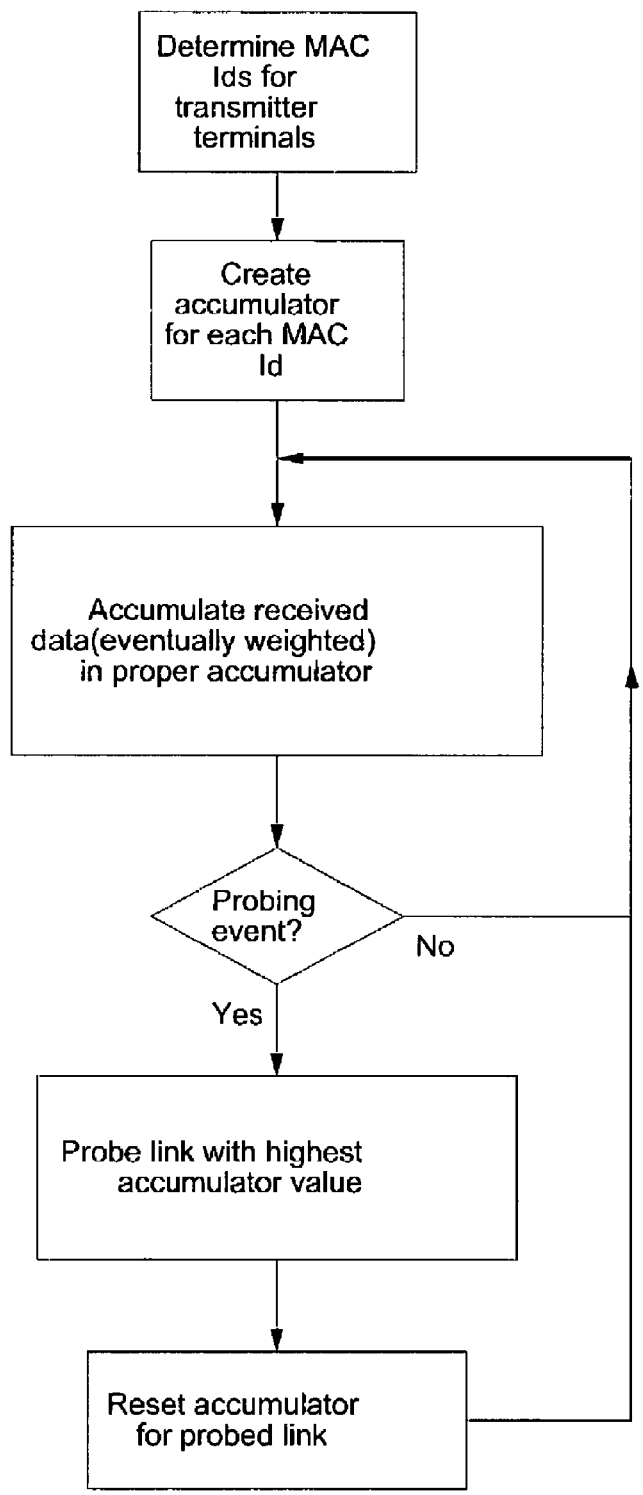
FIG. 4 is a flowchart of the process according to the preferred embodiment.

The flowchart of FIG. 4 describes the steps of the process according to the present embodiment.

According to a variant embodiment, the receiver terminal implements a chained, ordered list of elements representing the MAC Ids of the transmitting terminals. The list is ordered in decreasing order of accumulator value. Each element contains a MAC Id, the corresponding accumulator value and pointers to the previous and next element.

When a packet is received, the corresponding accumulator is updated, and the corresponding element is moved to a new position in the ordered list, by comparing its accumulator value with the immediately previous element's accumulator, and updating the pointers, until the correct position is reached. The initial list of elements is empty. An element is created when data is received from a transmitter terminal that does not yet have such an associated element.

This variant embodiment does not require the implementation of an algorithm to search the greatest accumulator value every time a probe is to be launched: it suffices to launch the probe with the terminal indicated in the first element of the list, to reset the accumulator value and to move that element to the end of the list.

Optionally, in order to avoid having elements for inactive transmitter terminals in the list, the receiver terminal determines whether a transmitter terminal transmits no data during a given period, and if such a terminal is detected, removes the corresponding element from the list. If the transmitter element starts sending data anew, a new element is created. For implementing this element destruction function, an additional counter is added to each element. The counters are initialised to a zero value. A counter is incremented each time its element is the first element of the list and the accumulator of this element is empty. This means that the transmitting terminal has not been active for a certain time. When the value of a counter reaches a predetermined value, e.g. 255, the corresponding element is destroyed.

As an alternative to the use of the above counter, it is proposed to cut off the end of a list when the list reaches a threshold number of elements.

According to a variant embodiment, a receiving terminal also probes transmitter terminals with which it does not have an operational link, in preparation of a future operational link. These transmitter terminals are probed at a low frequency. It is not possible to simply use low value coefficients, because since no data is received from these terminals, their accumulators would always be at zero.

Although the probes are carried out more or less periodically according to the embodiment in order not to occupy the medium for long intervals, this is not necessarily so, and several probes may be carried out consecutively or at irregular intervals.

The invention claimed is:

1. A method for rate regulation of radio link probing in a communication network comprising at least a receiver terminal and at least two transmitter terminals comprising:

determining the amount of data sent by each transmitter terminal to the receiver terminal through respective radio links, the determining step comprising the step of accumulating a value of a function taking into account an amount of data received from respective transmitter terminals and wherein the value that is accumulated is reset after a probe for its corresponding transmitter terminal has been carried out; and when a probing of a radio link is to be made, probing the radio link corresponding to the transmitter terminal having sent the greatest amount of data since last a probe, the probing of a radio link comprising an evaluation of a quality criterion, the quality criterion being based on a predetermined response triggered by a triggering message comprising a packet with no payload data and corresponding to at least a reception condition associated to the probed radio link, at least one parameter of the radio link being modified if a value of evaluated quality criterion is better than a value of evaluated quality criterion of a last probe.

2. The method according to claim 1, wherein the amount of data received from a transmitter terminal is weighted before being added to a corresponding accumulator.

3. The method according to claim 2, wherein the weight used for the data from a given transmitter terminal is a function of the type of data transmitted by said given transmitter terminal.

4. The method according to claim 2, wherein an element of a ordered chained list is associated with each transmitter terminal, each element comprising a transmitter terminal identifier, the current accumulator value and pointers to the previous and next element, the list being ordered according to decreasing accumulator content.

5. The method according to claim 3, wherein elements corresponding to transmitter terminals not having transmitted for a given period of time are removed from the list.

6. The method according to claim 1, wherein probing is carried out substantially periodically.

7. The method according to claim 1, further including the step of probing transmitter terminals with no operational link.

* * * * *